United States Patent
Ilac et al.

(10) Patent No.: US 8,132,246 B2
(45) Date of Patent: Mar. 6, 2012

(54) KERBEROS TICKET VIRTUALIZATION FOR NETWORK LOAD BALANCERS

(75) Inventors: Cristian Ilac, Sammamish, WA (US); Paul J. Leach, Seattle, WA (US); Tarek B. Kamel, Issaqua, WA (US); Liqiang Zhu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 777 days.

(21) Appl. No.: 12/038,736

(22) Filed: Feb. 27, 2008

(65) Prior Publication Data

US 2009/0217029 A1 Aug. 27, 2009

(51) Int. Cl.
G06F 17/06 (2006.01)
G06F 15/16 (2006.01)
G06F 17/30 (2006.01)
H04L 29/06 (2006.01)

(52) U.S. Cl. .................................................... 726/10
(58) Field of Classification Search ................ 726/10
See application file for complete search history.

(56) References Cited

U.S. PATENT DOCUMENTS

| | | | |
|---|---|---|---|
| 5,544,322 A | 8/1996 | Cheng et al. | |
| 5,684,950 A | 11/1997 | Dare et al. | |
| 6,615,264 B1 | 9/2003 | Stoltz et al. | |
| 7,243,370 B2 | 7/2007 | Bobde et al. | |
| 2003/0188193 A1 | 10/2003 | Venkataramappa | |
| 2005/0091171 A1* | 4/2005 | Grobman | 705/64 |
| 2006/0074618 A1* | 4/2006 | Miller et al. | 703/13 |
| 2006/0230438 A1 | 10/2006 | Shappir et al. | |
| 2006/0236385 A1 | 10/2006 | Innes et al. | |
| 2007/0006291 A1 | 1/2007 | Barari et al. | |
| 2007/0127723 A1 | 6/2007 | Grobman | |
| 2007/0143836 A1 | 6/2007 | Bowers et al. | |

OTHER PUBLICATIONS

Sirbu, et al., "Distributed Authentication in Kerberos Using Public Key Cryptography", available at least as early as Sep. 4, 2007, at pkda.pdf>>, pp. 8.*
Chappell, "Exploring Kerberos, the Protocol for Distributed Security in Windows 2000", at <<http://www.microsoft.com/msj/0899/kerberos/kerberos.aspx>>, Microsoft Corporation, 1999, pp. 10.
Neuman, et al., "Kerberos: An Authentication Service for Computer Networks", at <<http://gost.isi.edu/publications/kerberos-neuman-tso.html>>, IEEE, 1994, pp. 11.
"Service Virtualization: Managing Change in a Service-Oriented Architecture", Cisco Systems, 1992-2007, pp. 12.
Sirbu, et al., "Distributed Authentication in Kerberos Using Public Key Cryptography", available at least as early as Sep. 4, 2007, at <<http://www.informedia.cs.cmu.edu/documents/pkda.pdf>>, pp. 8.

* cited by examiner

*Primary Examiner* — Kambiz Zand
*Assistant Examiner* — Stephen Sanders
(74) *Attorney, Agent, or Firm* — Lee & Hayes, PLLC

(57) ABSTRACT

An exemplary group ticket for a Kerberos protocol includes a service ticket encrypted with a dynamic group key and a plurality of enveloped pairs where each pair includes a name associated with a member of a group and an encrypted the dynamic group key for decryption by a key possessed by the member of the group where decryption of an encrypted dynamic group key allows for decryption of the service ticket. Other exemplary methods, systems, etc., are also disclosed.

18 Claims, 10 Drawing Sheets

GROUP MEMBER MGMT.
390

MEMBER ADD, DELETE, RENAME
392

SECURITY CHANGE/UPDATE
(E.G., PASSWORD, KEY TYPE, ETC.)
394

PROPAGATION OF INFORMATION TO MEMBERS
396

KDC COMMUNICATION MODULE
398

FIG. 6

KERBEROS TICKET VIRTUALIZATION FOR NETWORK LOAD BALANCERS

BACKGROUND

To meet client demands, computing environments should be scalable, available and manageable. Technologies referred to generally as "clustering" aim to address such concerns. A "cluster" may be defined as a group of independent computers that work together to run a common set of applications and that provide an image of a single system to a client and application. More generally, a cluster may be defined as a set of resources, made available to users and presented as a unified entity to the users.

While client users may not be aware that a cluster exists, they expect server-based resources (e.g., applications and data) to be readily available. To meet such expectations, an administrator should be able to scale and manage cluster resources. Developers can also play a role by developing applications that appear unified to a client yet "cluster-aware" to an administrator.

In a client-server cluster architecture, when overall load for a cluster-aware application exceeds resource capabilities of a cluster (e.g., CPU, disk space, I/O capacity, bandwidth), scalability addresses the ability to add resources to the cluster (e.g., scale up and/or scale out). For example, formerly, administrators that desired future system expansion capability needed to make up-front commitments to expensive, high-end servers that provided space for additional CPUs, drives, and memory. With clustering and cluster-aware applications, administrators can add resources as needed to meet, for example, overall processing power requirements.

With respect to high availability, when a component or an application in a cluster fails, cluster software should respond, for example, by restarting the failed application or dispersing work from the failed component to another component in the cluster. With respect to manageability, clustering technologies often provide a graphical console with tools, for example, to facilitate moving applications and data within the cluster to different servers. Such a clustering feature can be used, for example, to manually balance workloads and to unload servers for planned maintenance without downtime.

A clustering technology known as network load balancing (NLB) includes aspects of scalability, availability and manageability. NLB provides for strategic distribution of client requests or TCP/IP traffic to appropriate resources in a cluster. Some commercially available clustering technologies provide for NLB in a cluster around 30 hosts (e.g., servers). NLB may be achieved via hardware (e.g., a NLB device) or via software (e.g., NLB software running on one or more devices). A NLB scheme often presents a common "virtual" IP address for an entire cluster and transparently partitions client requests across the multiple servers in the cluster. NLB provides high availability and high scalability to the Internet applications.

Some NLB techniques use a "heartbeat" to detect machine failures. For example, a heartbeat between nodes can contain resource health information to enable the cluster to determine the level of failure and amount of fail over required. If a failure occurs, an NLB algorithm can direct workload to healthy machine. NLB may perform automatic load balancing of session based traffic and allow for easy addition of hosts to a cluster.

Where a cluster requires security, load balancing can become problematic. For example, a Kerberos security protocol can provide server authentication to a given client by the means of a trusted 3rd party (Key Distribution Center—KDC) where the client, instead of authenticating to a given server, it authenticates to a group of servers. This group of servers shares a group key dynamically. The group key is randomly generated on the fly, and then encrypted with the server's long term key. Using this technique, there are many copies of the same group key in the encrypted form, one copy encrypted by the key of each server in this server group. In a cluster, a group of computers may service requests directed to a virtual computer (e.g., a "virtual" server). For example, a sever cluster may be accessed through a virtual IP address that fronts real IP addresses. In such an example, routing of the requests from a virtual server (e.g., a virtual node) to a real computer (a real node) can be achieved by either hardware or software. Combining security and load balancing technologies poses a problem in terms of Kerberos authentication, especially where routing is via a hardware device that only provides routing support.

As described herein, various technologies address security in a computing environment that relies on load balancing.

SUMMARY

An exemplary group ticket for a Kerberos protocol includes a service ticket encrypted with a dynamic group key and a plurality of enveloped pairs where each pair includes a name associated with a member of a group and an encrypted dynamic group key for decryption by a long term key possessed by the member of the group where decryption of an encrypted dynamic group key allows for decryption of the service ticket. Other exemplary methods, systems, etc., are also disclosed.

DESCRIPTION OF DRAWINGS

Non-limiting and non-exhaustive examples are described with reference to the following figures:

FIG. 6 is a block diagram of an exemplary group member management module for tasks associated with a group ticket;

DETAILED DESCRIPTION

Various exemplary techniques described herein pertain to a Kerberos ticket suitable for use in an environment that relies on clustering. For example, a particular technique provides for Kerberos ticket virtualization for network load balancers.

As mentioned, a client normally sees a cluster as a unified resource such as a single server. In a conventional client-server Kerberos security scheme, a client is required to identify the server it wants to connect to. However, as a Network Load Balancing (NLB) server (or "network load balancer") is typically visible to clients as a single node, or accessed via a single node (e.g., a virtual node), a client does not typically know anything about servers in the cluster "hidden" behind the single node. While the client generally knows a name of such a node, the classic Kerberos protocol prohibits registration of all of the "real" nodes under a common Server Principle Name (SPN) because the SPN is an identifier of a single long term key and each node has its own key and these keys are different. Various exemplary techniques described herein encrypt a ticket in a temporary key, which can be accomplished without altering the classic Kerberos abstraction.

An exemplary technique includes configuring a key distributing center (KDC) in such a way that an issued service ticket can be decrypted by more than one entity (for instance using a scheme where the key used is encrypted using keys associated with each cluster node and subsequently added to the ticket). According to this exemplary technique, a ticket issued to a client can be used on each cluster node transparently from the point of view of the client. According to an exemplary KDC configuration technique, group accounts can be used as a management paradigm. Such an approach allows an application to take advantage of NLB configurations without requiring any changes to the application. In such an approach, only changes to a KDC and underlying cluster node OSs would be required and group membership of a virtual server (or other node front) can be managed centrally on the KDC.

Figure 1:
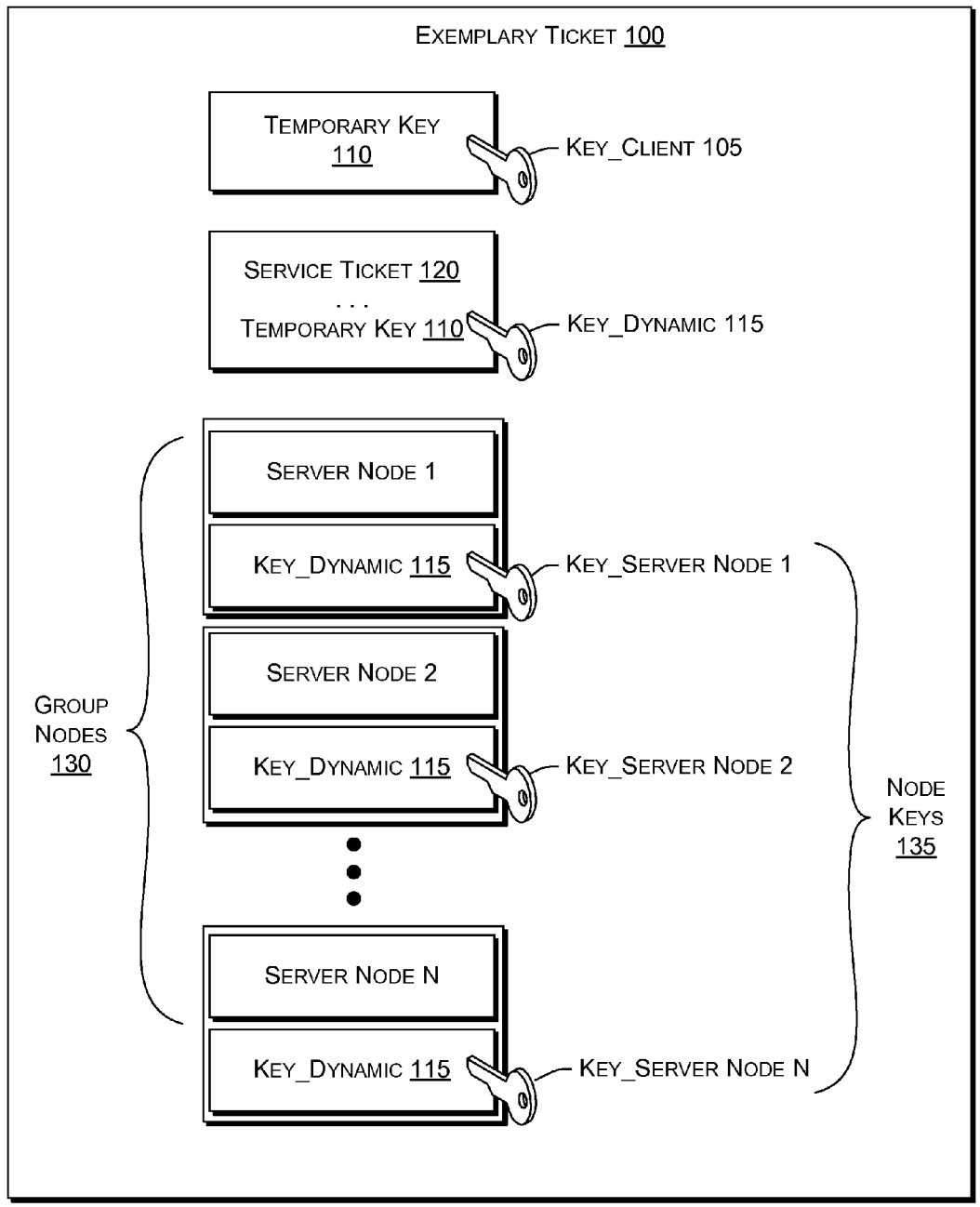
FIG. 1 is a diagram of an exemplary group ticket for use with a security protocol.

FIG. 1 shows an exemplary ticket 100 for use in a cluster or a group. The example of FIG. 1 pertains to a client-server environment, noting that such a technique can be applied to other environments that include a cluster or, more generally, a group.

The ticket 100 includes a temporary key 110 (e.g., a session key), a service ticket 120 and one or more pairs, which are at times referred to as enveloped key pairs. In the example of FIG. 1, each pair includes a group node 130 and a dynamic group key 115. More specifically, in each pair, the dynamic group key 115 is capable of being decrypted by a server node key 135. Once the dynamic group key 115 is decrypted, the decrypted dynamic group key 115 may be used to decrypt the service ticket 120.

The ticket 100 can be used by a client to securely access resources associated with a specific server that is a member of a cluster or a group. In this manner, the cluster or the group may be managed by a virtual server that uses a virtual node to achieve network load balancing. For implementation, the ticket 100 does not require any modification to the virtual server. In the example of FIG. 1, the ticket 100 introduces only a small size overhead as it now contains more information than a typical single server ticket.

As mentioned, commercially available NLB technology may allow for cluster sizes on the order of 30 or so servers. Hence, an exemplary ticket for a cluster of 30 servers would be larger by approximately the margin of 30 times the size of an encrypted key plus the size of the server name.

As described herein, a group ticket for a Kerberos protocol can include a service ticket encrypted with a dynamic group key and a plurality of enveloped pairs where each pair includes a name associated with a member of a group and an encrypted dynamic group key for decryption by a key possessed by the member of the group where decryption of an encrypted dynamic group key allows for decryption of the service ticket.

Figure 2:
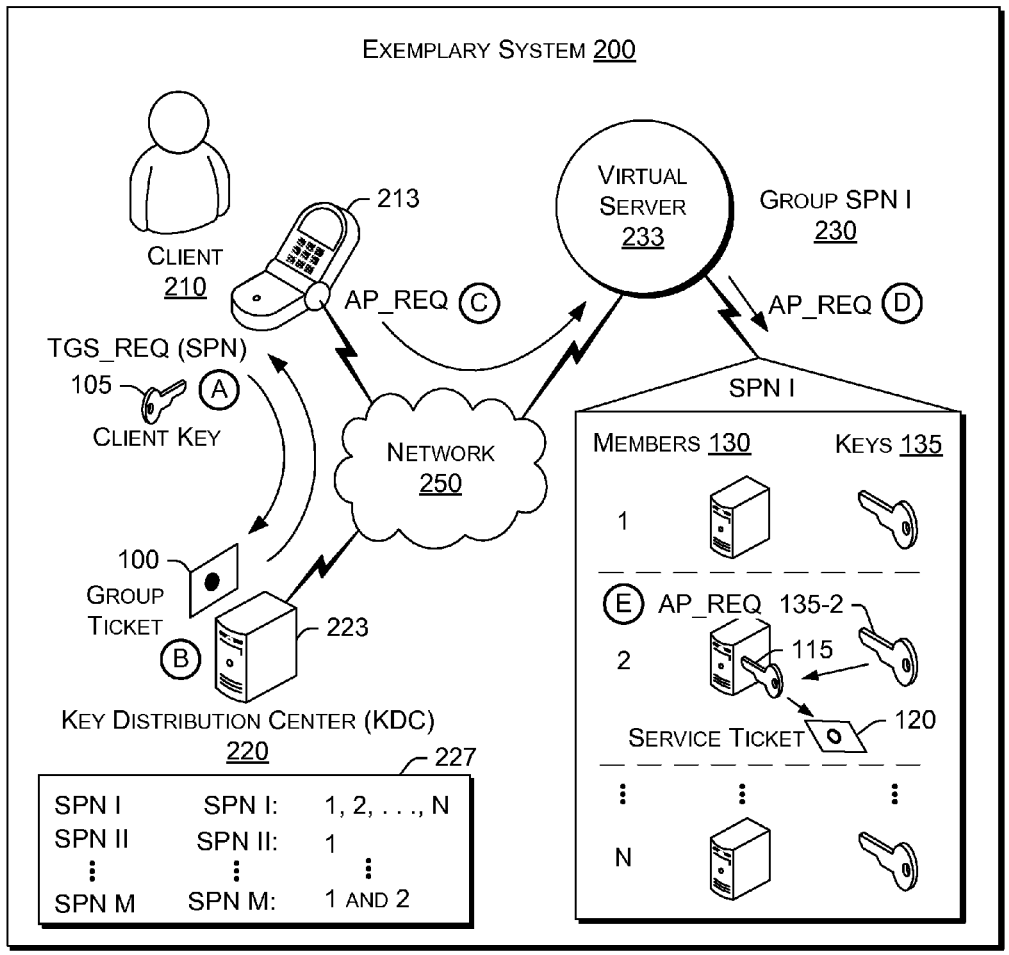
FIG. 2 is a diagram of an exemplary system and timeline for acquisition and use of the ticket of FIG. 1.
Figure 2:
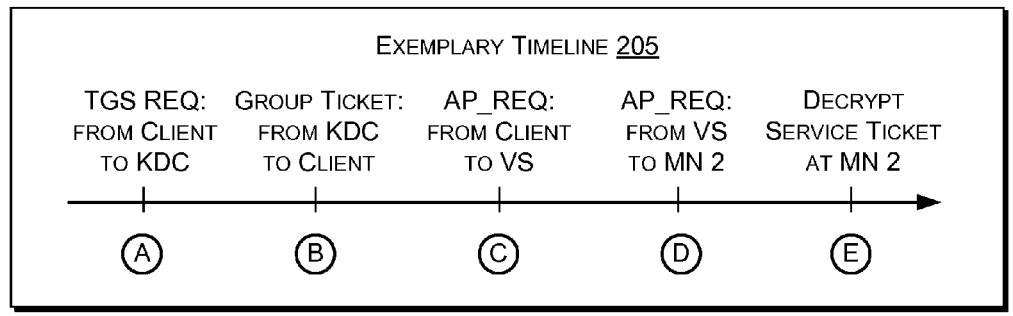

FIG. 2 shows an exemplary system 200 that uses the ticket 100 of FIG. 1. The system 200 includes a client 210 that uses a client device 213 in communication with a network 250, a key distribution center (KDC) 220 that uses a KDC computing device 223 in communication with the network 250 and a group 230 with a group name SPN I that uses a virtual server 233 (based on a computing device) in communication with the network 250.

A timeline 205 demonstrates use of the ticket 100. At a time A, the client 210 transmits a client key 105 with a ticket granting service request (TGS_REQ) to the KDC 220 where the request specifically provides the name of the group 230 (i.e., SPN I). At a time B, the KDC 220 issues the group ticket 100 to the client 210.

In the example of FIG. 2, the KDC 220 includes a directory of group names with member names for each group. This directory allows for ticket "virtualization" by associating an alternate security group and/or a list of alternate user/computer accounts to a given account, for example, with an already configured SPN. If the association includes groups, the KDC 220 may be configured to be responsible for expanding the groups to a list of individual user/computer accounts to be used for creating the list of SPN enveloped key pairs.

The ticket 100 includes enveloped key pairs for the members or group nodes 130 of the group SPN I 230. In the example of FIG. 2, each of the members 130 in the group 230 has a corresponding member node (e.g., MN 1, MN 2, . . . , MN N). However, as mentioned, the client 210 does not know or does not need to know anything about the specific members 130. The client 210 only needs to know that the apparently unified entity 230 exists and can provide resources for meeting some need of the client 210. Each enveloped pair of the ticket 100 includes a member name and the result of encrypting the service ticket key (e.g., the dynamic group key 115) with a corresponding member key 135 (e.g., key of a real node).

At a time C, the client 210 uses the device 213 to issue an application request (AP_REQ) to the Group 230, which is received by the virtual server 233, which, for example, may simply provide for basic routing to members 130 of the group. In such an example, the virtual server 210 may simply forward the application request and ticket 100 to a member node where the member node performs a check to see if its name appears in the ticket 100 (i.e., as being associated with an enveloped pair).

At a time E, the server at member node 2 (MN 2) uses its key 135-2 to decrypt the enveloped pair to provide the dynamic group key 115. In turn, the dynamic group key 115 is used to decrypt the service ticket 120. Once the service ticket 120 has been decrypted, for a Kerberos protocol, security steps may proceed as in a conventional arrangement.

As described herein, an exemplary method includes receiving an application request (e.g., item C in the timeline 205) and a group ticket that includes a name for a group, a service ticket and enveloped key pairs (e.g., the group ticket 100); routing the request and the group ticket to a member of the group where the member of the group includes a member key (e.g., item D in the timeline 205); decrypting a dynamic group key in one of the enveloped key pairs using the member key (e.g., key 135-2); and decrypting the service ticket using the dynamic group key (e.g., item E in the timeline 205).

Figure 3:
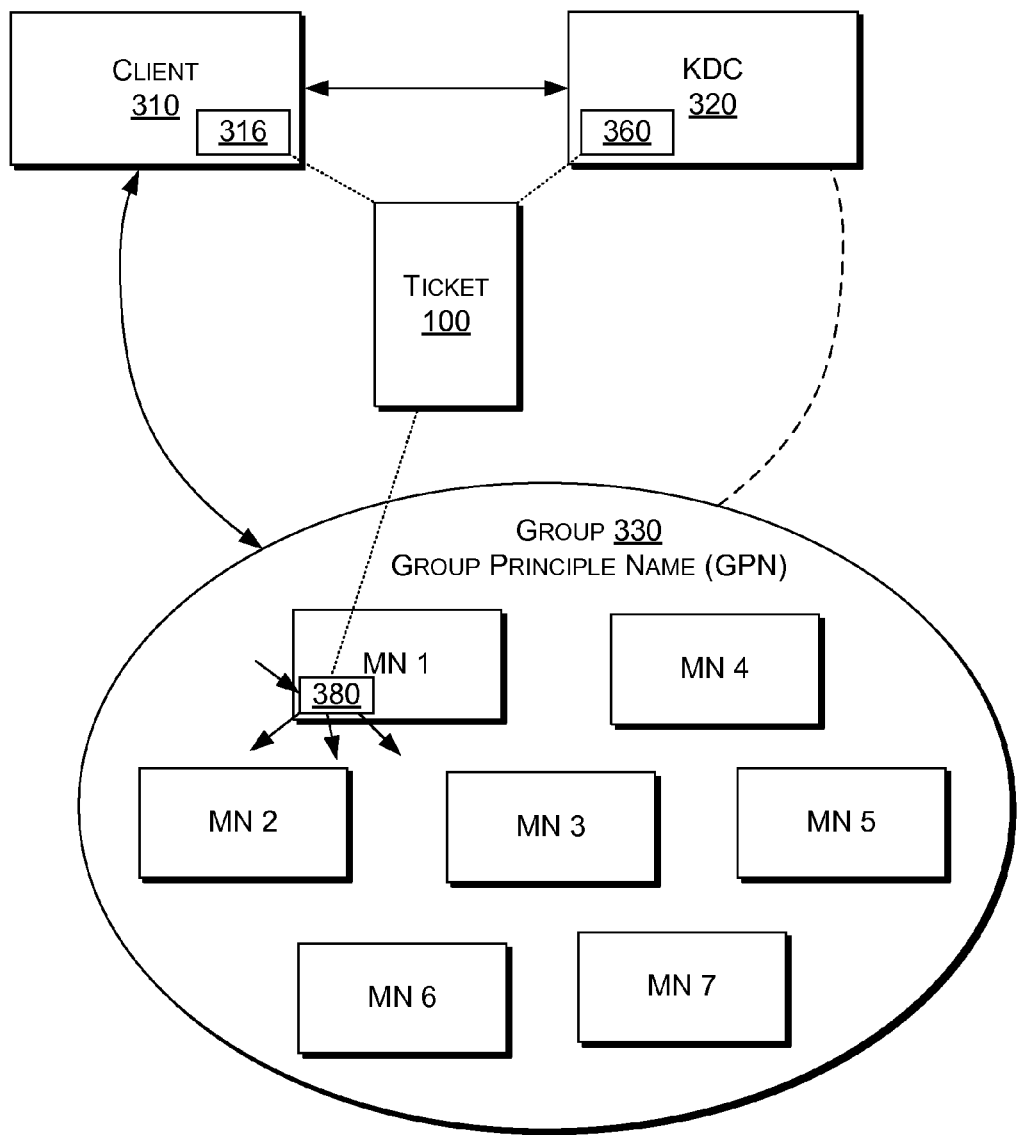
FIG. 3 is a block diagram of an exemplary system that includes components associated with a group ticket.

FIG. 3 shows an exemplary system 300 that includes a ticket 100, a client 310, a KDC 320 and a group 330. The group 330 has a Group Principle Name (GPN) and various members where each member has a member name (e.g., MN 1, MN 2, etc.). The client 310 includes a client-side component 316, the KDC 320 includes a KDC-side component 360 and the group 330 includes a group-side component 380. The components 316, 360 and 380 act cooperatively with respect to request, issuance and use of the ticket 100.

Figure 4:
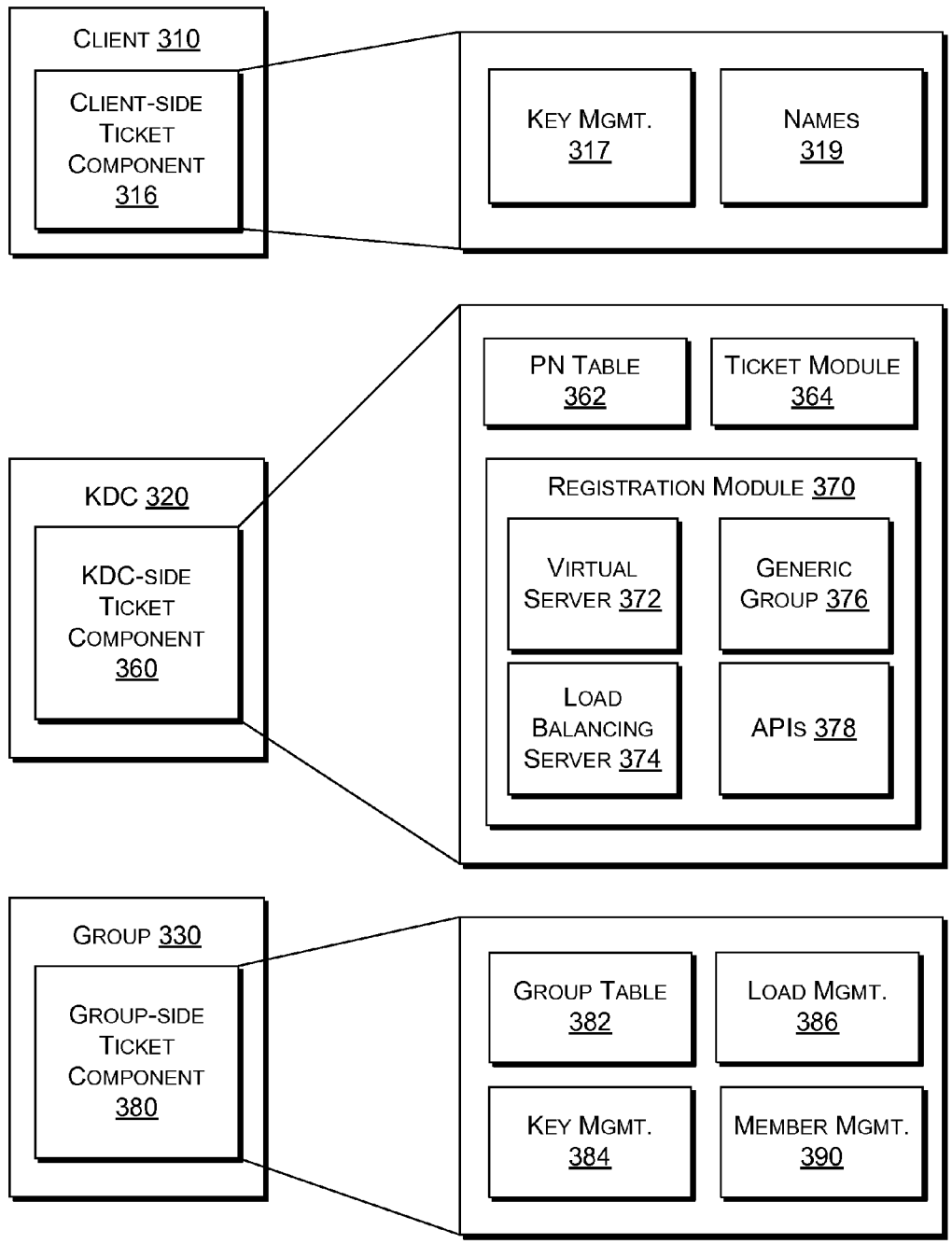
FIG. 4 is a block diagram of various components associated with a group ticket.

FIG. 4 shows the client 310 and client-side component 316, the KDC 320 and the KDC-side component 360 and the group 330 and the group-side component 380.

The client-side component 316 includes a key management module 317 and a names module 319. The key management module 317 allows a client to request tickets from a KDC and the names module 319 allows the client to know which entities require security information such as a ticket.

The KDC-side component 360 includes a Principle Name (PN) table 362, a ticket module 364 and a registration module 370. The PN table 362 maintains a list of names for entities, for example, on a network. The ticket module 364 allows for ticket generation, especially for ticket "virtualization" where a ticket includes one or more member names associated with a PN. The registration module 370 includes a virtual server feature 372 that allows a virtual server to register nodes, for example, the virtual server 233 or administrator for the group 230 can use the registration module 370 to register member names for nodes in the group. The registration module 370 includes a generic group feature 376 for registration of groups that may be organized in any of a variety of manners. For example, a company may maintain a group of resources that require a ticket for access. In such an example, the group may be accessed via a router or some other basis (e.g., client selection, geographic proximity, etc.).

The registration module 370 also includes a load balancing server feature 374. Such a feature may be used by a server (or other device) that performs load balancing. For example, an administrator of a load balancing server may use the feature 374 to enter nodes, delete nodes, change node names of nodes under management of the server. The registration module 370 also includes APIs 378 for facilitating or standardizing registration. For example, APIs 378 may include a name add/delete/change API call for use by an administrator.

The group-side ticket component 380 includes a group table module 382, a key management module 384, a load management module 386 and a member management module 390. The group table module 382 may simply keep a table of group names (e.g., member names for a group). The key management module 384 may be used to update any changes that occur with respect to one or more keys. The load management module 386 may associate load information with security information. For example, for a failed node, the load management module 386 may communicate such information to a KDC to ensure that a ticket does not include an envelope pair for the failed node. This can be used as an additional measure to ensure that a client does not attempt to access a failed node. The member management module 390 is explained in more detail with respect to FIG. 6.

Figure 5:
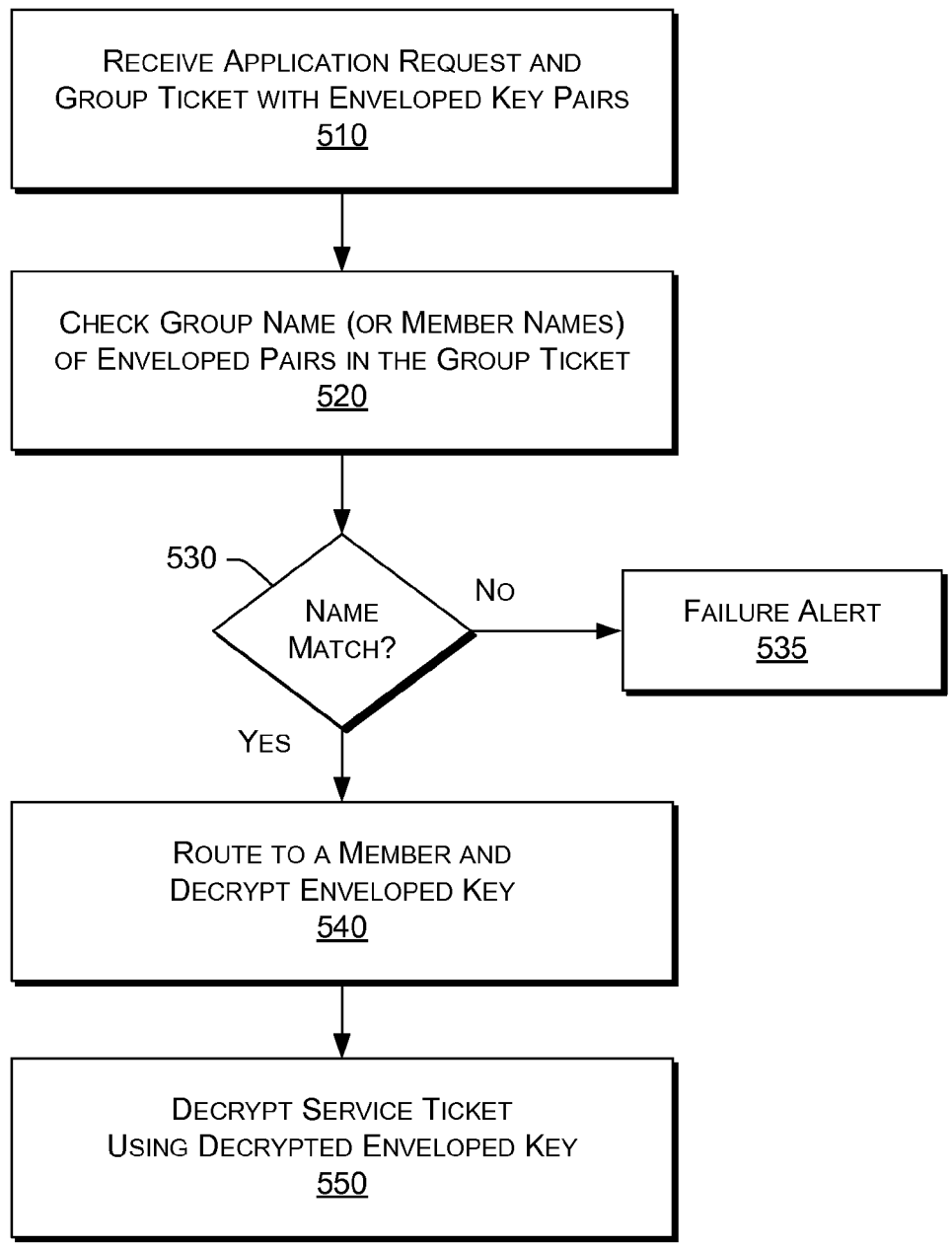
FIG. 5 is a block diagram of an exemplary method for implementation by a group or a cluster.

FIG. 5 shows an exemplary method 500 for implementation by a group-side computing device such as a virtual server or NLB device. The method 500 commences in a reception block 510 where a device receives an application request and a group ticket with enveloped key pairs.

A check block 520 and decision block 530 operate to check the server names of the enveloped pairs in the group ticket against one or more known server names and to see if a match occurred. While the check block 520 and the decision block 530 may be optional, it can be helpful to have a mechanism to ensure that the group ticket pertains to the group managed by the device that receives the ticket. In the example of FIG. 5, the decision block 530 decides if a match occurred (per the check block 520) for a server name in the group ticket. If no match is found, then security cannot be established and the method 500 issues a failure alert per block 535, which may send an alert to a requesting client and/or a KDC. If a match exists, which is the expected result, then the method 500 continues in a routing block 540 that routes at least the enveloped pair to the named device (e.g., a server in a network load balanced cluster fronted by a virtual server, etc.), which then decrypts the enveloped key using its device key. In turn, a decryption block 550 decrypts a service ticket included in the group ticket using the decrypted enveloped key (consider, e.g., the dynamic group key 115 of FIG. 1).

As mentioned, the method 500 can operate without introducing additional software or hardware to a routing device that routes requests to one or more resources in a cluster, particularly where the match blocks 520, 530 are not performed or performed by a node. For example, where a virtual server routes client requests to servers in a cluster, the method 500 can be optionally implemented without any additional virtual server software. In turn, the virtual server may be "free" to perform assigned tasks more effectively (e.g., load balancing, routing, etc.).

FIG. 6 shows an exemplary group member management module 390. The module 390 includes a member add, delete, rename feature 392, a security change/update feature 394, a propagation feature 396 and a KDC communication module 398. The propagation feature 396 may be used by a virtual server to propagate information to members of a group. For example, if the KDC indicates that a change is required to information in a security protocol, the propagation feature 396 may be used to ensure that nodes are aware and appropriately updated by any consequences of the change.

Figure 7:
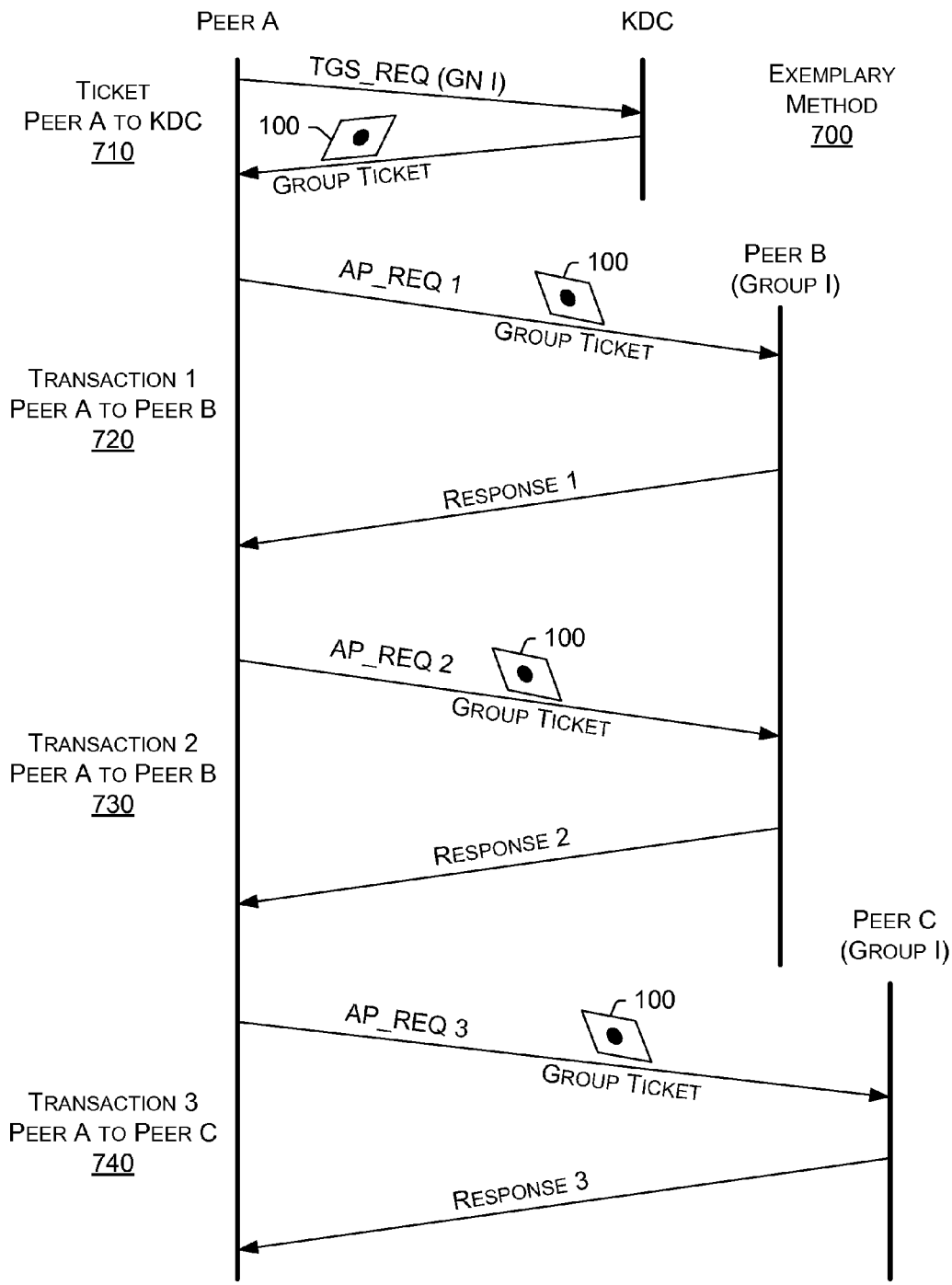
FIG. 7 is a diagram of an exemplary method for transacting with one or more members of a group.

FIG. 7 shows an exemplary method 700 where a single group ticket is used for multiple transactions with a member of a group and/or in transactions with more than a single member of a group. In an issuance step 710, a Peer A requests a group ticket 100 from a KDC. In a first transaction 720, the Peer A sends the group ticket 100 to Peer B, a member of Group I, along with a first request and then receives a first response from Peer B. In a second transaction 730, the Peer A sends the group ticket 100 to Peer B along with a second request and then receives a second response from Peer B. Thus, Peer A was able to conduct two transactions with Peer B using a single group ticket 100. A KDC may limit the number of transactions, limit the time frame, etc., of a group ticket. Such limitations may be imposed by a group administrator.

In the example of FIG. 7, a third transaction 740 occurs between Peer A and Peer C, which is also a member of Group I. As the group ticket 100 can include envelope pairs for each member of a group, Peer A can conduct multiple transactions with different group members using a single group ticket 100.

Figure 8:
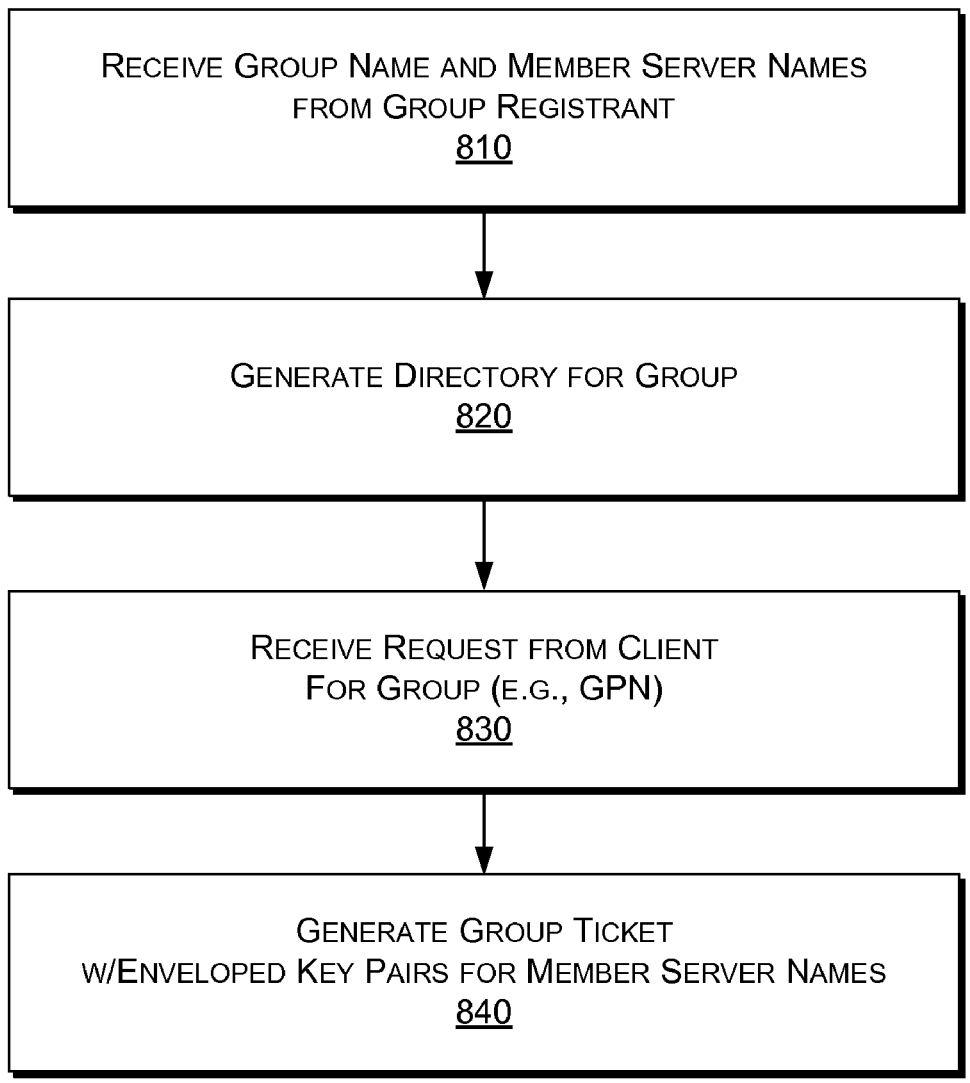
FIG. 8 is a block diagram of an exemplary method for generating a group ticket.

FIG. 8 shows an exemplary method 800 for implementation by a KDC. In a reception block 810, a group name and member server names are received from a group registrant. In a generation block 820, a directory for the group is generated. In a reception block 830, a request is received from a client for a particular group (e.g., GPN). In turn, if the directory exists for the stated group, then a ticket generation block 840 generates a group ticket with enveloped key pairs for member server names in the group. Such a ticket may then be sent to the client. As mentioned, the group ticket may include restrictions as to time, number of transactions, number of different member names for transactions, etc.

As described herein, an exemplary method includes receiving a group name and member names from a group registrant (e.g., block 810), storing the member names (e.g., block 820), receiving a ticket granting request from a client where the request includes a group name (e.g., block 830) and generating a group ticket (e.g., block 840) where the group ticket includes an encrypted service ticket and enveloped key pairs for each of the member names where each envelope key pair includes an encrypted dynamic group key where decryption of an encrypted dynamic group key allows for decryption of the encrypted service ticket.

In general, the group ticket 100 can provide additional security measures not found in a conventional single entity ticket. Such additional security measures may be related to the fact that a group ticket can be used by multiple members of a group. In a NLB server (or "network load balancer" device), while a series of transactions typically occur with a single server in a group, situations may arise where a series of transactions occur with multiple servers in the group. Further, if a client uses a group server in a manner that crashes a server (e.g., causes a server failure), then a restriction as to use of multiple envelope pairs for a series of transactions can prevent the client from accessing another server in the group. For example, a virtual server or NLB device will typically be aware of failures (e.g., via heartbeats) and may re-route a request to another server if the initial request resulted in a server failure (e.g., software and/or hardware failure). A group ticket that restricts use to a single node (i.e., a single server) in a cluster can prevent re-routing of such a request. Alternatively, or in addition to, a mechanism may issue an alert to indicate that a particular client request was associated with a failure. A data store that associates clients with failures can be used to increase security. Such information may be shared with a KDC to prevent future failures and to identify issues that may have led to a failure.

Figure 9:
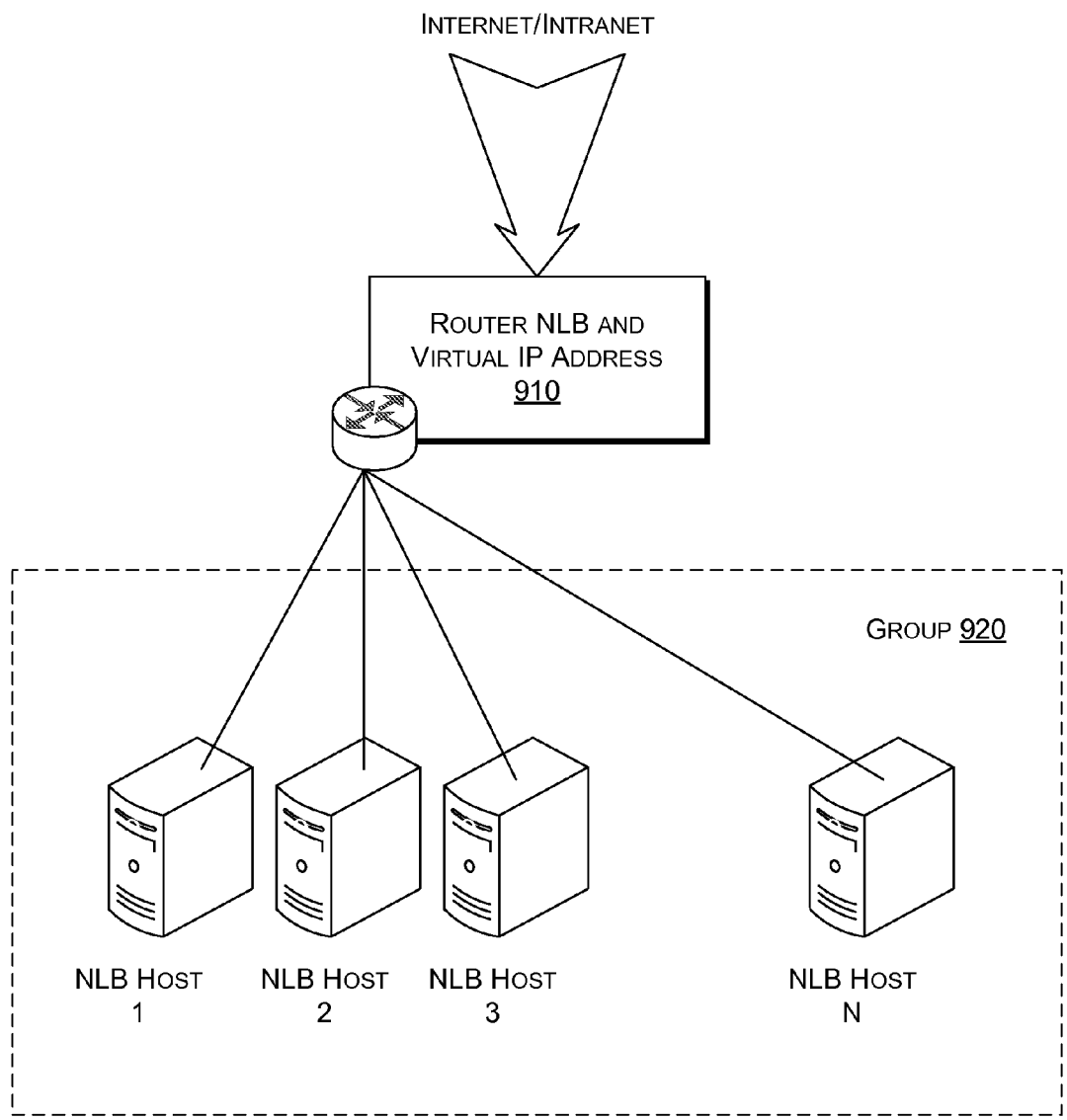
FIG. 9 is a block diagram of an exemplary environment that includes Network Load Balancing (NLB) for a group.

FIG. 9 shows an exemplary environment 900 that includes a router for NLB (e.g., a NLB device) 910 having a virtual IP address (or associated with a virtual IP address) to receive requests from the Internet and/or an intranet. While the environment 900 shows a single NLB device, an environment may have multiple NLB devices (e.g., master/slave arrangement) associated with a virtual IP address. In the example of FIG. 9, the router 910 routes requests to one or more members of a group 920, where the group 920 may be a cluster having requests managed by the router 910. The members of the group 920 are referred to as network load balanced hosts 1 to N (NLB hosts). As described herein, an exemplary ticketing scheme allows security validation to be pushed downstream to the host level. Such a scheme also allows for use of a Kerberos protocol as security is handled by a specific node or host within the group 920. This scheme places a responsibility to manage the group membership on a KDC as the KDC is required to issue a group ticket with security information for members of the group 920. In the example of FIG. 9, the security information can be in the form of enveloped pairs per the example of FIG. 1, where each pair can be decrypted by a key possessed by an individual member of the group 920. While the keys generally differ amongst members of the group 920, depending on the level of security required, instances may occur where one or more members of the group 920 have identical keys (i.e., lower security).

Exemplary Computing Device

Figure 10:
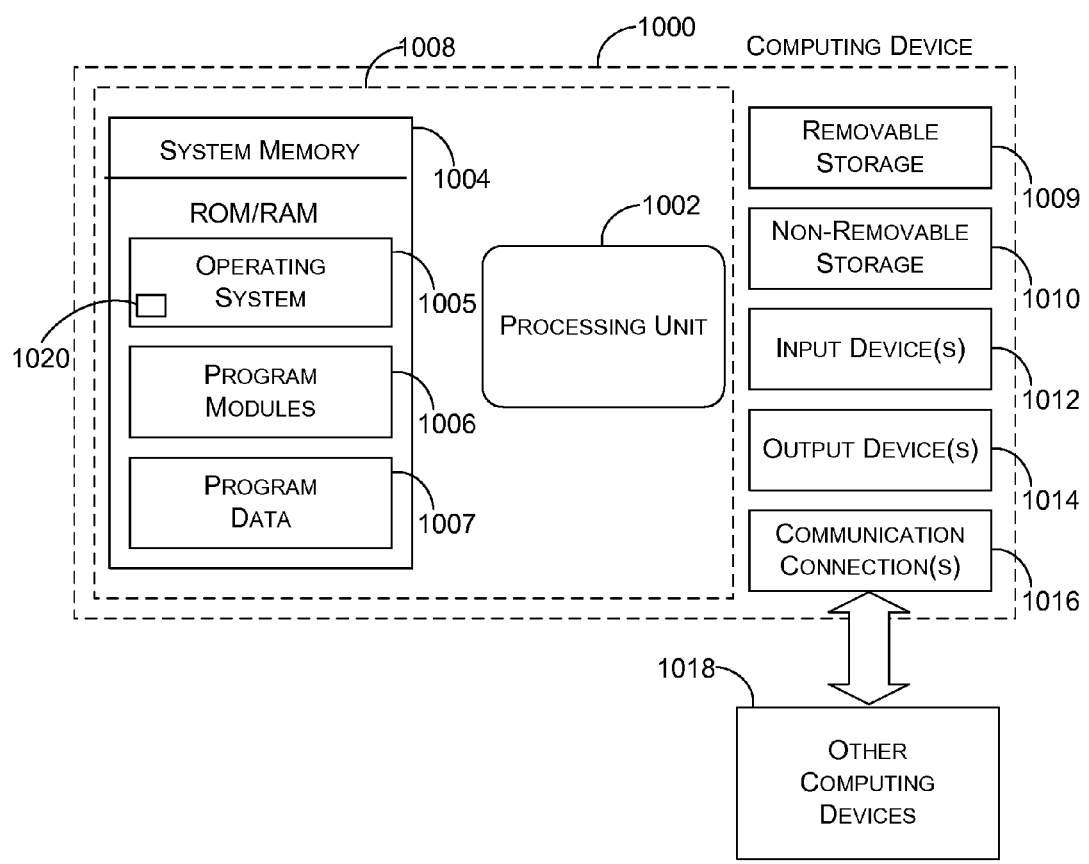
FIG. 10 is a block diagram of an exemplary computing device.

FIG. 10 illustrates an exemplary computing device 1100 that may be used to implement various exemplary components and in forming an exemplary system. For example, the servers and clients of the system of FIG. 2 may include various features of the device 1000.

In a very basic configuration, computing device 1000 typically includes at least one processing unit 1002 and system memory 1004. Depending on the exact configuration and type of computing device, system memory 1004 may be volatile (such as RAM), non-volatile (such as ROM, flash memory, etc.) or some combination of the two. System memory 1004 typically includes an operating system 1005, one or more program modules 1006, and may include program data 1007.

The operating system 1005 include a component-based framework 1020 that supports components (including properties and events), objects, inheritance, polymorphism, reflection, and provides an object-oriented component-based application programming interface (API), such as that of the .NET™ Framework manufactured by Microsoft Corporation, Redmond, Wash. The device 1000 is of a very basic configuration demarcated by a dashed line 1008. Again, a terminal may have fewer components but will interact with a computing device that may have such a basic configuration.

Computing device 1000 may have additional features or functionality. For example, computing device 1000 may also include additional data storage devices (removable and/or non-removable) such as, for example, magnetic disks, optical disks, or tape. Such additional storage is illustrated in FIG. 10 by removable storage 1009 and non-removable storage 1010. Computer storage media may include volatile and nonvolatile, removable and non-removable media implemented in any method or technology for storage of information, such as computer readable instructions, data structures, program modules, or other data. System memory 1004, removable storage 1009 and non-removable storage 1010 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of device 1000. Computing device 1000 may also have input device(s) 1012 such as keyboard, mouse, pen, voice input device, touch input device, etc. Output device(s) 1014 such as a display, speakers, printer, etc. may also be included. These devices are well know in the art and need not be discussed at length here.

Computing device 1000 may also contain communication connections 1016 that allow the device to communicate with other computing devices 1018, such as over a network (e.g., consider the aforementioned network 250 of FIG. 2). Communication connections 1016 are one example of communication media. Communication media may typically be embodied by computer readable instructions, data structures, program modules, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. Computer-readable storage media including instructions executable by one or more processors to perform acts comprising:

transmitting a client key with a ticket granting service request to a key distribution center, the ticket granting service request specifying a name of a group; and receiving a group ticket for a Kerberos protocol from the key distribution center, the group ticket comprising:

the name of the group;

a service ticket encrypted with a dynamic group key; and a plurality of enveloped pairs wherein each enveloped pair comprises a name associated with a member of the group and an encrypted dynamic group key for decryption by a key possessed by the member of the group whereby decryption of a particular encrypted dynamic group key allows for decryption of the service ticket.

2. The computer-readable media of claim 1 wherein the group ticket further comprises a temporary session key.

3. The computer-readable media of claim 1 wherein the name of the group comprises a server principle name associated with a network load balancer.

4. The computer-readable media of claim 3 wherein the server principle name comprises a name associated with a virtual network load balancer.

5. The computer-readable media of claim 4 wherein the virtual network load balancer comprises a virtual IP address.

6. The computer-readable media of claim 1 wherein the name of the group comprises a server principle name corresponding to a network load balancing server.

7. The computer-readable media of claim 1 wherein the group ticket further comprises one or more restrictions associated with a number of different member names for transactions.

8. A method comprising:
   under control of one or more processors configured with executable instructions:
   receiving, at a network load balancer, an application request and a group ticket that comprises a name for a group associated with the network load balancer and a service ticket including enveloped pairs, each enveloped pair comprising a key and a member name;
   routing the request and the group ticket to members of the group named in the enveloped pairs, wherein the members of the group named in the enveloped pairs each comprises a member key;
   decrypting a dynamic group key in one of the enveloped pairs using the member key of the member of the group named in the one of the enveloped pairs; and
   decrypting the service ticket using the dynamic group key.

9. The method of claim 8 wherein the routing comprises load balancing among the members of the group.

10. The method of claim 8 wherein the group name comprises a server principle name of the network load balancer.

11. The method of claim 8 wherein the group ticket comprises an enveloped key pair for each member of the group.

12. The method of claim 8 further comprising creating a virtual server and performing the routing using the virtual server.

13. The method of claim 8 further comprising routing the request and the group ticket to more than one member of the group wherein each of the members of the group comprises a member key capable of decrypting the dynamic group key.

14. The method of claim 8 wherein the routing to more than one member occurs for a single group ticket.

15. The method of claim 8 wherein the group ticket allows for routing to more than one member of the group wherein each of the members comprises a member key capable of decrypting the dynamic group key.

16. A system comprising:
   a key distribution center including one or more processors and memory storing instructions that, when executed, configure the one or more processors to perform acts comprising:
   receiving a group name and member names of members of the group from a group registrant, wherein the group name comprises a server principle name associated with a network load balancer;
   storing the member names;
   receiving a ticket granting request from a client wherein the request comprises the group name; and
   generating a group ticket that comprises an encrypted service ticket and enveloped pairs for each of the member names, each enveloped pair comprising an encrypted dynamic group key and the member name whereby decryption of an encrypted dynamic group key allows for decryption of the encrypted service ticket.

17. The system of claim 16 wherein the network load balancer comprises a network load balancing server.

18. The system of claim 17 wherein the network load balancing server comprises a virtual server.

* * * * *